United States Patent [19]

Gresham

[11] 3,786,196

[45] Jan. 15, 1974

[54] TOLL CALL DENIAL CIRCUIT

[75] Inventor: Perry Thomas Gresham, Fort Worth, Tex.

[73] Assignee: American Telephone and Telegraph Company, New York, N.Y.

[22] Filed: Aug. 28, 1972

[21] Appl. No.: 284,441

[52] U.S. Cl. .......... 179/18 DA
[51] Int. Cl. .......... H04m 1/66
[58] Field of Search .......... 179/18 DA

[56] References Cited

UNITED STATES PATENTS

| | | | |
|---|---|---|---|
| 3,651,275 | 3/1972 | Regniere | 179/27 CB |
| 3,553,382 | 1/1971 | Knox et al. | 179/18 DA |

*Primary Examiner*—Thomas W. Brown
*Attorney*—H. F. Walsh and C. H. Davis

[57] ABSTRACT

A toll call denial circuit for allowing local calls and blocking toll calls outgoing from PBXs (Private Branch Exchanges). Following seizure of a central office line by a PBX station dialing "9", the call denial circuit distinguishes between local and toll calls by having a counter and decoder register and check the first digit dialed over the line to determine if it is a toll access digit such as "0" or "1". The denial circuit includes a pulse suppressor circuit having a resistor-capacitor filter which prevents spurious signals on the line from being detected as dial pulses. Following registration of the first dialed digit, the time characteristic of this filter is changed to prevent the counter from registering dial pulses of a subsequently dialed digit but allowing a response to an on-hook condition on the line to release the denial circuit.

9 Claims, 4 Drawing Figures

TOLL CALL DENIAL CIRCUIT

BACKGROUND OF THE INVENTION

This invention relates to toll call denial circuits that block toll calls originating from PBXs and particularly to circuitry for controlling toll denial circuits to block responses to dial pulsing and to release the circuits following the termination of a call.

The prior art includes a number of toll call denial circuits that divert toll calls originating from a PBX to the PBX operator or to a recorded announcement that instructs the caller to call the PBX operator in order to complete the call. A substantial number of these denial circuits are customarily of electromechanical relay designs which have proven to be bulky and to consume relatively high amounts of power. The electromechanical designs have also proven to be subject, among other things, to relay contact contamination and to require periodic maintenance for mechanical adjustment and test.

Recent trends have been to replace electromechanical call denial circuits with electronic circuits which consume relatively small amounts of power, require a small amount of physical plant space, and require less maintenance. In such electronic circuit versions, it is necessary to detect and distinguish between dial pulsing and on-and-off hook supervisory signals in order to properly control the operations of the call denial circuits. In order to do so, the prior electronic art teaches obtaining these signals from different sources. Illustratively, electronic circuitry is connected to a central office line to detect dial pulsing and other circuitry is connected via a separate control wire to either an associated PBX trunk circuit or to a switchhook contact of a calling PBX substation to detect the supervisory signals. The first of these two sources of obtaining supervisory signals requires that a call denial circuit be located relatively near the PBX trunk circuits in order to minimize call denial circuit installation costs. The second of these two sources requires that call denial circuits be provided on a per telephone station basis. In a PBX having more than a few telephone stations from which calls are to be restricted, the second method is obviously undesirable from an economic standpoint.

In view of the foregoing, it is apparent that a need exists in the call denial circuit art for electronic control facilities in call denial circuits which enable dial pulse and supervisory signals to be detected at a common source and then be appropriately operated upon to process toll and non-toll calls.

SUMMARY OF THE INVENTION

The foregoing need of the call denial circuit art is satisified by an illustrative embodiment of my invention wherein electronic control facilities are provided in a call denial circuit for monitoring dial pulse and supervisory signals transmitted over a PBX outgoing trunk. Specifically, my control facilities include a counter and decoder which are operated by a control circuit for registering and checking the first digit dialed over a PBX outgoing trunk after a party at a calling PBX station dials "9" and is connected thereto. The counter and decoder ascertain whether a toll call is being placed and hence is to be denied. In accordance with a feature of my invention a pulse suppressor circuit is provided which prevents only spurious signals on the line from being registered. The control circuit causes the operation of the suppressor circuit to change at the end of pulsing of the first digit dialed to prevent the counter from registering dial pulses of a subsequently dialed digit in order that the call denial determination is not impaired. Advantageously, the suppressor circuit includes a resistor-capacitor filter network having a time characteristic which blocks detection of the spurious signals. My control facilities modify the time characteristic of the filter following the end of pulsing of the first digit dialed over the line so that the filter blocks subsequent dial pulses but does not block a supervisory on-hook signal from being detected. The supervisory on-hook signal causes my control facilities to release the call denial circuit following termination of a completed or attempted call by a calling PBX station.

The control facilities in accordance with my invention are integrated into an exemplary call denial circuit which works with PBXs associated with a central office at which a toll call may be placed through a central office operator or by prefixing the called station number with the toll access digit "1". Following connection of a calling PBX station to a PBX outgoing trunk and central office line to place a call outside the PBX, as by dialing a conventional preliminary access digit "9", the counter in the call denial circuit registers dial pulses of the first digit subsequently dialed over the line and the decoder determines if a toll call is being placed. If the digit "0" or "1" is the digit registered, the decoder cooperates with the control circuit to connect the calling PBX station to a recorded announcement instructing the caller to hang up and replace the call through the PBX operator in order to complete the call. The call denial circuit further cooperates with the decoder to allow a call to be completed when a digit other than "0" or "1" is registered in the counter. In this manner the call denial circuit assures that all toll calls from a PBX must be placed through a PBX operator, but all other calls may be completed without operator assistance.

To elaborate, when a party at a calling PBX station dials "9" and is connected via an outgoing trunk to a central office line to place an outgoing call, a line current detector circuit detects dial pulse and supervisory signals on the T and R leads of the central office line and repeats them over a common lead to my illustrative electronic circuitry. The dial pulses of the first digit dialed over the line are shaped by a multivibrator, registered by the counter, and the decoder determines if the first digit is the digit "0" or "1". Accordingly, the call is either allowed to be completed or is terminated. My control circuit determines when all dial pulses of the first dialed digit have been received by monitoring the period between pulses. Thereafter, the control circuit advantageously enables the pulse suppressor circuit to block any further dial pulsing detected on the central office line from triggering the multivibrator. In this manner only the first digit dialed over the line is registered and there is no possibility of having one or more dial pulses being additionally registered in the counter to give an erroneous indication of the first digit.

The pulse suppressor circuit consists of a resistor-capacitor low pass filter which is connected to the input of the multivibrator. The filter has a time characteristic that prevents spurious signals on the line from triggering the multivibrator. In response to an indication from the control circuit that dial pulsing for the first digit has been registered and checked a second capacitor is connected to the filter to change the time characteristic. The new time characteristic of the filter prevents the multivibrator from being triggered by subsequent dial puses. Advantageously the new time characteristic of the filter is sufficiently short so that it does not prevent the triggering of the multivibrator by a subsequent supervisory signal caused by placing the handset of the calling PBX station on-hook to terminate either an attempted toll call or a completed non-toll call. An on-hook supervisory signal has a much longer time period than a dial pulse and is not blocked by the filter. The control circuit responds to the on-hook supervisory signal to reset the call denial circuitry in preparation to serve a subsequent call.

In accordance with my invention, the decoder and control circuit cooperate with a polarity reversal protection circuit to allow completion of a non-toll call to a called station in a routine manner.

BRIEF DESCRIPTION OF THE DRAWING

My invention will be more clearly understood by reading the following description of an exemplary embodiment of my invention in conjunction with the drawing, in which:

In FIGS. 1, 2, and 3 the equipment has been given a single alphabetic and/or numeric designation which is prefixed by a single digit indicating the figure in which the equipment is located. Thus, for example, the central office line current detector is assigned the number 11 and if it is referred to as detector 211 in the specification, it is the appearance of detector 11 in FIG. 2 that is being referred to.

GENERAL DESCRIPTION

Figures 1, 4:
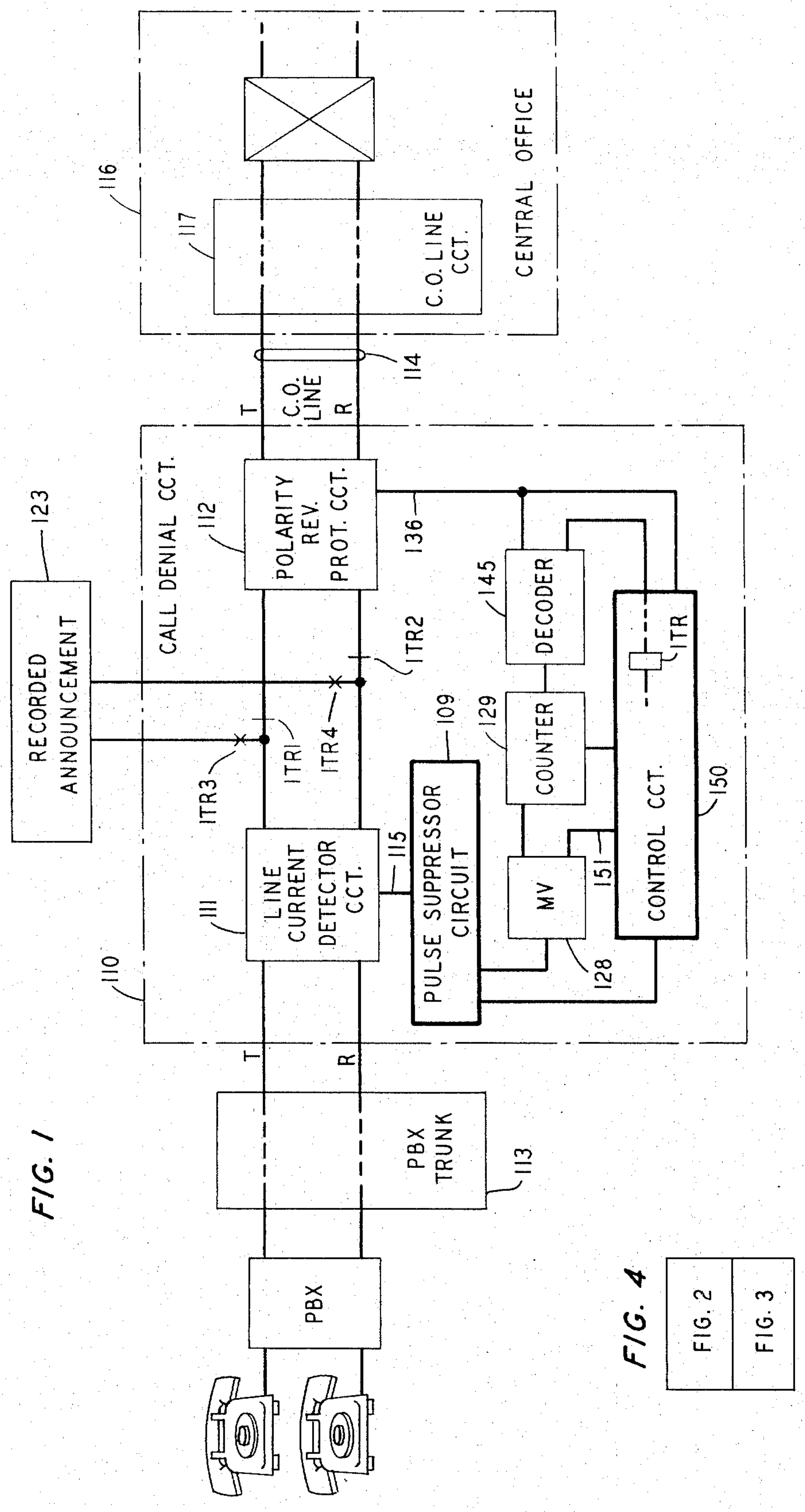
FIG. 1 is a block diagram of call denial equipment employing a control circuit and a pulse suppressor circuit in accordance with this illustrative embodiment of my invention.
FIG. 4 shows the manner in which FIGS. 2 and 3 should be arranged to simplify tracing the circuits.

Referring to FIG. 1, therein is shown call denial circuit 110 which includes pulse suppressor circuit 109 and control circuit 150 in accordance with this embodiment of my invention. Line current detector 111 and polarity reversal protection circuit 112 are connected into transmission leads T and R between PBX trunk 113 and central office line 114. PBX trunk 113 is connected via call denial circuit 110 and line 114 to central office 116 and functions with line circuit 117 thereat in what is known in the art as a ground start mode.

When a calling PBX station is connected to PBX trunk 113 to place an outgoing call over line 114 after dialing the digit "9", supervisory current flows over leads T and R between trunk 113 and central office line circuit 117 in a manner well known in the art. Detector 111 detects this current and provides a signal over lead 115 and through suppressor circuit 109 to one-shot multivibrator 128. Multivibrator 128 does not responds respond this off-hook signal as it is designed to respond only to a signal change from the off-hook current condition to the on-hook no-current condition. As the calling PBX station dials the first digit over line 114, the station dial interrupts the current flowing over leads T and R a number of times equal to the digit dialed in a manner well known in the art. Detector circuit 111 repeats each of these dial pulses on lead 115. Multivibrator 128 responds to each current to no-current change to produce a shaped pulse output. These pulses are counted by counter 129 to be checked by decoder 145 at the end of the first dialed digit.

The pulses output from multivibrator 128 are also applied to control circuit 150 which monitors the period of time in between dial pulses to determine when the end of pulsing of the first digit occurs.

At the end of the first dialed digit, control circuit 150 causes decoder 145 to check the contents of counter 129 to determine if the digit "0" or "1" has been dialed. Decoder 145 generates an output signal accordingly which causes control circuit 150 to initiate one of two courses of action. Upon determining that the digit "0" or "1" has been dialed, decoder 145 generates a first output signal that operates relay 1TR in control circuit 150. Break contacts 1TR1 and 1TR2 of relay 1TR open leads T and R toward line 114, and make contacts 1TR3 and 1TR4 connect the calling PBX station to recorded announcement 123 which instructs the calling party to hang-up and recall the PBX operator in order to complete the call. The PBX operator records the toll calls and completes them over another central office line (not shown) which is not equipped with my call denial circuit.

Importantly, control circuit 150 causes the time characteristic of suppressor circuit 109 to be changed after the first digit dialed. Suppressor circuit 109 contains a resistor-capacitor low pass filter that ordinarily filters out spurious signals but its time characteristic is modified by control circuit 150 so that signals of the duration of dial pulses are filtered out and thereby conditions multivibrator 128 to respond only to a subsequent on-hook signal as described in detail hereinafter.

In the event decoder 145 determines that a digit other than "0" or "1" has been dialed it generates a second output signal which is sent to control circuit 150, and over lead 136 to energize protection circuit 112. The second output signal also causes control circuit 150 to modify the time characteristic of the filter in suppressor circuit 109 to perform the function previously described. Thus, the resistor-capacitor filter in suppresor circuit 109 filters out signal changes on lead 115 caused by dial pulsing after the first digit dialed over line 114. Advantageously, the only signal change on lead 115 that will subsequently be passed through suppressor circuit 109 to trigger multivibrator 128 will be the on-hook supervisory signal when the call on line 114 is terminated. In this manner pulse suppressor circuit 109 and control circuit 150 cooperate with other circuitry in call denial circuit 110 to detect and distinguish between dial pulsing and supervisory signals detected on line 114 by detector 111.

Protection circuit 112 is energized by the second output signal on lead 136 at the end of the first dialed digit. Circuit 112 is responsive to a reversal of voltage polarity applied to leads T and R at central office 116 to connect the voltages back over leads T and R toward PBX trunk 113 so that the trunk doesn't sense the polarity reversal. Such undesired polarity reversals occur, for example, when a called station answers to a Step-by-Step office. Protection circuit 112 ensures that the PBX does not sense a voltage polarity reversal, for some PBXs respond to a polarity reversal to terminate a call.

DETAILED DESCRIPTION

PBX Outgoing Call

Figure 2:
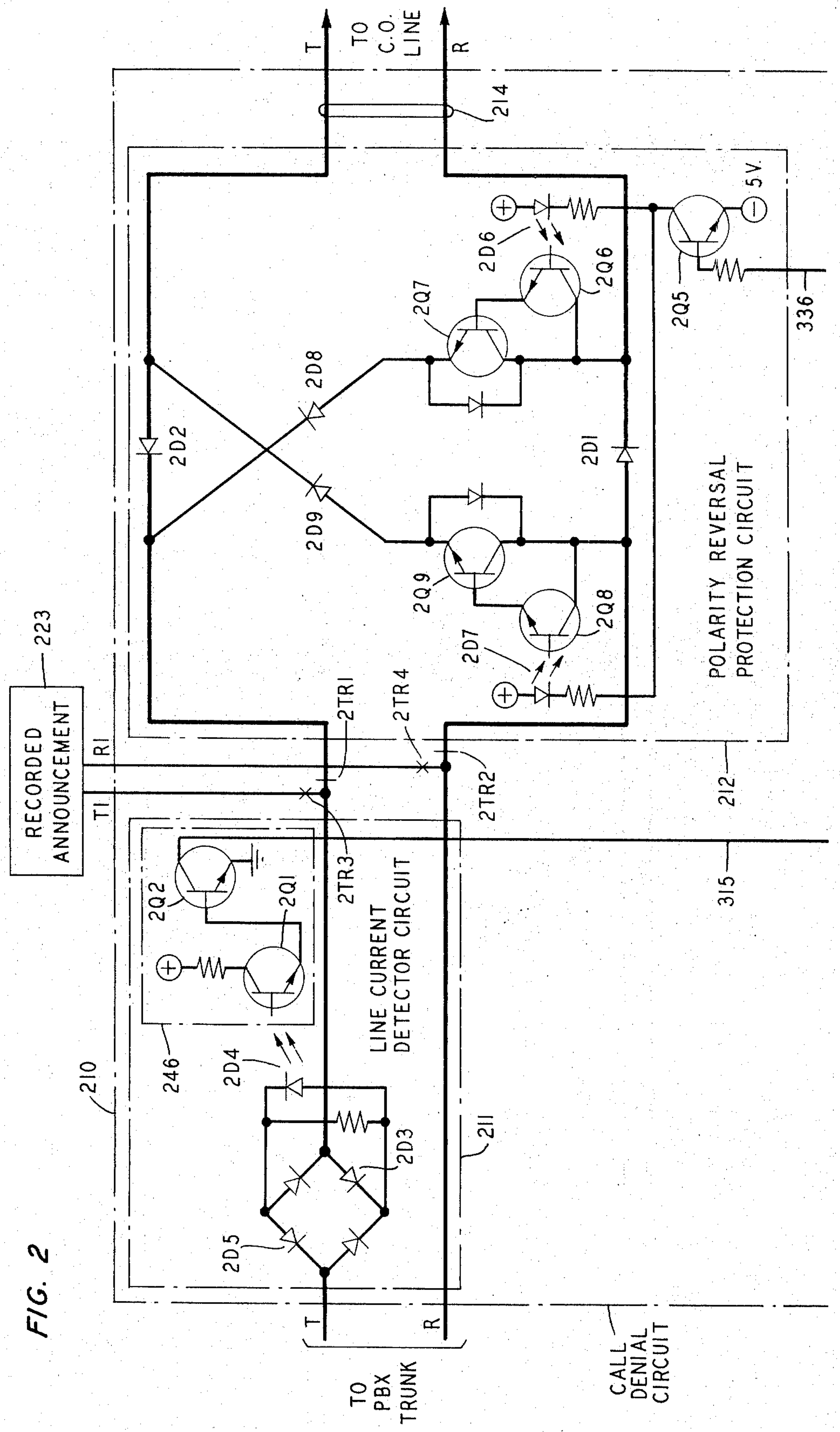
FIG. 2 is a schematic diagram of a line current detector circuit and a polarity reversal protection circuit in the illustrative call denial equipment.

In FIG. 2, a PBX station is connected via a PBX trunk and call denial circuit 210 to central office line 214 to place an outgoing call. Supervisory current flows through transmission leads T and R between the PBX trunk and the central office (not shown) in a manner well known in the art. The supervisory current flows through call denial circuit 210 over a path starting in the central office, through lead T of line 214, diode 2D2 in protection circuit 212, break contact 2TR1, diodes 2D3, 2D4 and 2D5 in line current detector circuit 211, to the PBX trunk on lead T. The supervisory current returns on lead R from the PBX trunk to flow through break contact 2TR2 and diode 2D1, to return to the central office via lead R of line 214.

Diode 2D4 in detector circuit 211 is a light emitting diode which is optically coupled to phototransistor 2Q1. With supervisory current flowing through leads T and R, transistor 2Q1 conducts and causes transistor 2Q2 to conduct to generate a ground potential on lead 315 as an indication of the off-hook condition.

Figure 3:
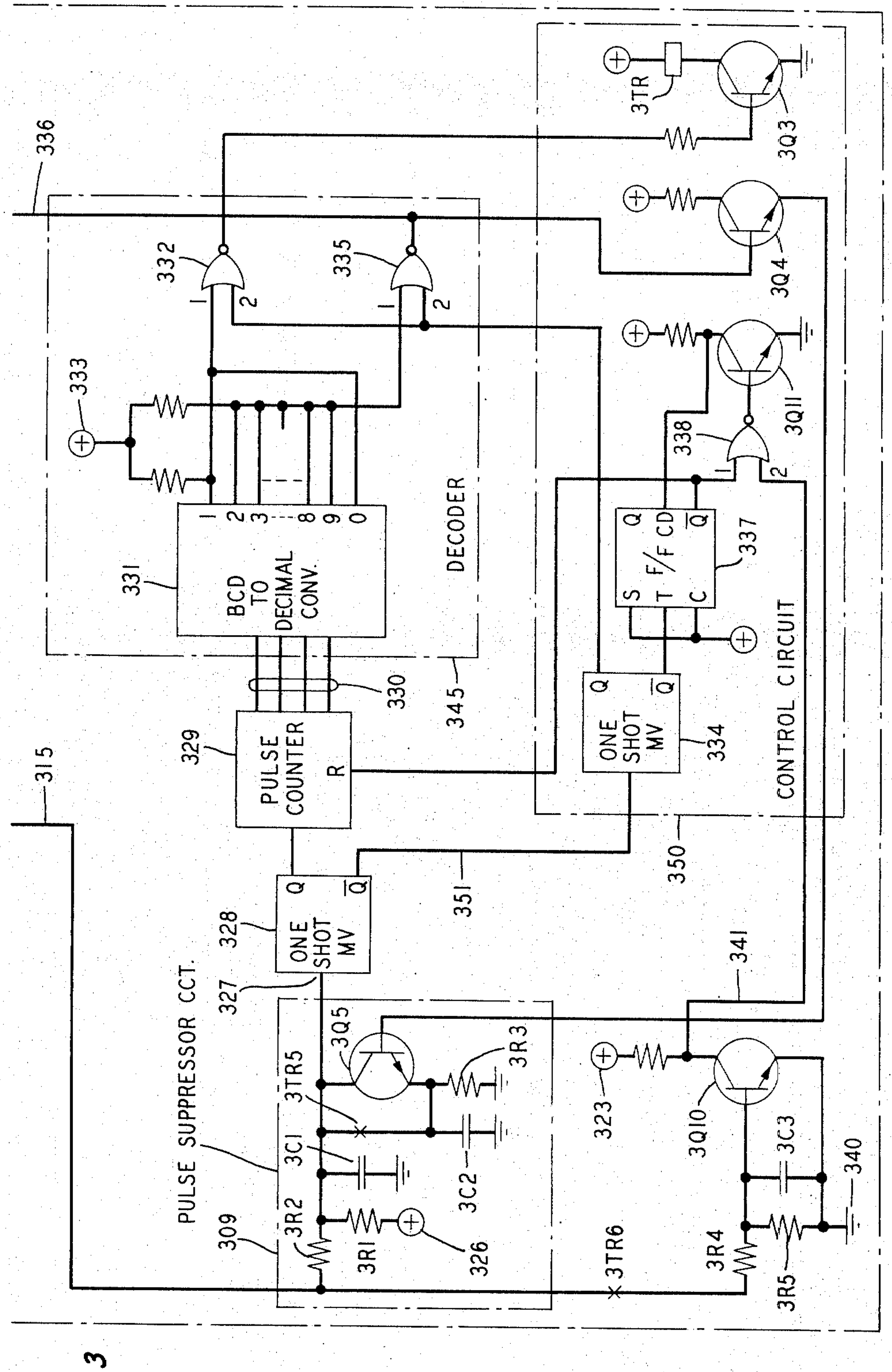
FIG. 3 is a schematic diagram of the control circuit and pulse suppressor circuit, in accordance with this embodiment of my invention, integrated into the illustrative call denial equipment.

In FIG. 3, prior to a call being originated from the PBX over central office line 214, positive potential 326 in suppressor circuit 309 is applied through resistor 3R1 to input 327 of one-shot multivibrator 328. Upon the appearance of ground potential on lead 315, in response to the off-hook signal, current flows between potential 326 and the ground potential on lead 315. The voltage division of potential 326 across resistors 3R1 and 3R2 causes input 327 to become more negative, but multivibrator 328 is not triggered because it requires a positive voltage change in order to be triggered. In this manner multivibrator 328 does not respond to a calling PBX station being connected to line 214 to place an outgoing call, but prepares multivibrator 328 to be triggered by subsequent dial pulsing interruptions of the supervisory current. In this illustrative embodiment of my invention, resistor 3R1 has a value of 4,700 ohms and resistor 3R2 has a value of 15 ohms. The voltage division is such, therefore, to in essence place input 327 of multivibrator 328 at ground potential.

Dialing of the first digit over line 214 results in the dial contacts in the calling PBX station loop opening and closing a number of times corresponding to the digit dialed. Assuming the calling party had dialed "0," the supervisory current flowing through the station loop will be interrupted ten times. Each time the supervisory current ceases to flow through diode 2D4, transistors 2Q1 and 2Q2 cease conduction and ground potential is removed from lead 315 for the duration of the dial pulse. While ground potential is absent from lead 315, division of potential 326 across resistors 3R1 and 3R2 ceases. This causes potential 326 to again be applied through resistor 3R1 to input 327 of multivibrator 328. As a result, input 327 experiences a positive voltage transition that triggers multivibrator 328, illustratively, to produce a 70 millisecond output pulse on both its Q and $\overline{Q}$ outputs.

Spurious transient interruptions of the current flowing through diode 2D4 are also repeated over lead 315 but do not trigger multivibrator 328. A filter consisting of resistor 3R1 and capacitor 3C1 is connected to input 327 of multivibrator 328 that only permits signals having a period greater than 40 milliseconds to trigger multivibrator 328. Spurious signals are almost always shorter than 40 milliseconds duration. On the other hand, dial pulses customarily exceed 40 milliseconds duration so they do trigger multivibrator 328.

Each pulse from output Q of multivibrator 328 is input to pulse counter 329 to be counted, but the counter must first be enabled to count as now described. Output $\overline{Q}$ of multivibrator 328 is normally at a positive potential (high) and goes to ground potential (low) for 70 milliseconds each time the multivibrator is triggered. In response to the first dial pulse, retriggerable one-shot multivibrator 334 is triggered by the negative transition at the beginning of the 70 millisecond pulse on lead 351 from output $\overline{Q}$ of multivibrator 328. Accordingly, multivibrator 334 generates a 100 millisecond pulse at both its Q and $\overline{Q}$ outputs. As each dial pulse for the first dialed digit occurs at less than a 100 millisecond interval, the corresponding pulses on lead 351 keep retriggering multivibrator 334. As a result, multivibrator 334 generates one elongated output pulse having a duration slightly exceeding the period of pulsing the first digit. In this manner multivibrator 334 determines the end of pulsing of the first dialed digit. Output $\overline{Q}$ of multivibrator 334, which is normally high (positive) and goes low (ground) for the period of the elongated pulse, is connected to toggle input T of flip-flop 337. The negative transition at the leading edge of the elongated pulse causes flip-flop 337 to change from its clear state to its set state. This causes output $\overline{Q}$ of flip-flop 337, which is normally high, to go low. The low $\overline{Q}$ output of flip-flop 337 is connected to reset input R of counter 329 and enables the counter to count. While input R of counter 329 is high, the counter is cleared to zero count and is prevented from counting. The time required for multivibrator 334 and flip-flop 337 to both be energized, as just described, is very short and counter 329 is enabled to count very shortly after the start of the 70 millisecond pulse at output Q of multivibrator 328. Thus, counter 329 is enabled to count dial pulses of the first digit dialed.

After the first dialed digit over line 214 is registered in counter 329, the digit must be checked. The contents of counter 329 are output in binary coded decimal (BCD) form on leads 330 and applied to BCD to decimal converter 331 in decoder 345. If the first digit is the restricted digit "0" or "1," output lead 0 or 1 of converter 331 is low correspondingly. A low output on either one of these two output leads makes the 1 input of NOR gate 332 low. When the 2 input of gate 332 is concurrently low, at the end of pulsing of the first digit as described hereinafter, the output of gate 332 goes high and causes transistor 3Q3 to conduct. The conduction of transistor 3Q3 completes an operate path to relay 3TR, contacts of which cause the calling station to be switched through to recorded announcement device 223 for receiving instructions to complete the denied call.

The Q output of multivibrator 334 is used to make the 2 input of NOR gate 332 low at the end of the first dialed digit. Output Q of multivibrator 334 is normally low and goes high for the period of the priorly described elongated pulse. At the end of the elongated pulse both inputs of logic gate 332 are low and the output of gate 332 is thereby caused to go from its normally low state to a high state. The output of gate 332 is connected to the base of transistor 3Q3 and when the output is high the transistor conducts and thereby causes relay 3TR to operate. The operation of relay 3TR causes the call on line 214 to be terminated. In FIG. 2, the opening of break contacts 2TR1 and 2TR2 disconnects the calling PBX station from line 214, while the closing of make contacts 2TR3 and 2TR4 connect the calling PBX station to recorded announcement 223 that instructs the calling party to call the PBX operator in order to complete the call.

The dialing of a first digit of 2 through 9 indicates an allowed call and, as priorly described, converter 331 provides a ground potential output on the appropriate output lead. The 2 through 9 outputs of converter 331 are all connected to the 1 input of NOR gate 335. The 2 input of gates 332 and 335 are strapped together and are both high during the period of the elongated pulse as priorly described. At the end of the elongated pulse both inputs of gate 335 are low and its output goes high. The output of gate 335 is connected to the base of transistor 3Q4, and also via lead 336 to the base of transistor 2Q5 in protection circuit 212. When the output of gate 335 is high it causes transistors 2Q5 and 3Q4 to conduct. The emitter of transistor 3Q4 is connected to the base of transistor 3Q5, so transistor 3Q5 also conducts when transistor 3Q4 conducts. The function of circuit 212 is described in detail further in the specification.

ENABLING THE PULSE SUPPRESSOR

Regardless of whether a call is allowed or denied, the time characteristic of the filter in pulse suppressor 309 is modified immediately after decoder 345 has checked the first digit dialed over line 214. For an allowed call the placement of transistor 3Q5 in its conducting state, as priorly described, causes capacitor 3C2 and resistor 3R3 to be connected in parallel with resistor 3R1 and capacitor 3C1. For a denied call make contact 3TR5 performs the same function. Capacitor 3C2 changes the time characteristic of the low pass filter to make multivibrator 328 insensitive to dial pulsing. Illustratively, the filtering action of the resistor-capacitor network is changed to extend the time duration that a pulse on lead 315 must have in order to trigger multivibrator 328 from 40 milliseconds to 200 milliseconds. As dial pulses are much shorter than 200 milliseconds any further dial pulsing repeated over lead 315 will not trigger multivibrator 328. In accordance with the teachings of my invention, however, multivibrator 328 is still able to respond to an on-hook supervisory condition to place denial circuit 310 in its idle state where it is ready to respond to a subsequent call on line 214.

POLARITY REVERSAL PROTECTION

Progressive type switching networks commonly cause supervisory potentials on central office lines to be reversed when a called party answers. Certain types of PBX equipment function readily with polarity reversals, but other PBX equipments react to a polarity reversal to terminate the call on the central office line over which a polarity reversal occurs. When PBX equipment of the latter type is to be associated with a progressive type switching network, polarity reversal protection circuits are provided that prevent the PBX equipment from sensing the reversals. In FIG. 2, polarity reversal protection circuit 212 performs this function. When line 214 is seized to place an outgoing call, the supervisory voltages applied to the line cause current to flow through diodes 2D1 and 2D2 as described at the beginning of the detailed description. A subsequent polarity reversal back biases diodes 2D1 and 2D2, causing supervisory current to cease flowing and the call is terminated. To prevent this the energization of protection circuit 212 provides an alternate current path through diodes 2D8 and 2D9 which are connected so that the PBX trunk equipment never senses the polarity reversal.

As priorly described, when an allowed call is being placed over line 214 the output of gate 335 goes from low to high and causes transistor 2Q5 to conduct and energize protection circuit 212. The conduction of transistor 2Q5 energizes light emitting diodes 2D6 and 2D7 which are optically coupled to phototransistors 2Q6 and 2Q8 respectively. Transistors 2Q6 and 2Q8 conduct and cause transistors 2Q7 and 2Q9 to conduct. Thus, there is a path completed between the anodes of diodes 2D8 and 2D9 and lead R of line 214 as it passes through protection circuit 214. With diodes 2D8 and 2D9 inserted between lead T and R supervisory current flows through leads T and R in the PBX trunk circuit as it did initially. After polarity reversal, current flows from the negative potential on the T lead in the central office, through diode 2D9, transistor 2Q9, break contact 2TR2, lead R, the calling PBX station loop, lead T, diodes 2D5, 2D4 and 2D3, break contact 2TR1, diode 2D8, transistors 2Q7, and lead R of line 214 to ground potential at the central office.

TERMINATION OF A CALL

In accordance with my invention, pulse suppressor circuit 309 in FIG. 3 distinguishes between dial pulsing and on-hook supervisory signals while resistor 3R3 and capacitor 3C2 are connected to input 327 of multivibrator 328. While dial pulsing is unable to trigger multivibrator 328, as previously described, an on-hook supervisory signal, which exceeds 200 milliseconds duration, is able to trigger the multivibrator. The pulse output from multivibrator 328 is used to restore all circuits in call denial circuit 210, 310 to their normal state and the denial circuit is ready to check a subsequent outgoing call on line 214.

When the calling PBX party goes on-hook, following completion of an allowed call, or following connection to recorded announcement 223, the supervisory current flowing through leads T and R is interrupted by the opening of the calling station loop at the switchhook contact. As a result, transistors 2Q1 and 2Q2 cease conduction and ground potential is removed from lead 315. In FIG. 3, the absence of ground potential on lead 315 changes the voltage division of potential 326 in suppressor circuit 309. Prior to the on-hook condition resistor 3R3 is electrically connected in parallel with resistor 3R2 due to ground potential on lead 315. Current flows from ground potential, through the parallel combination of resistors 3R2 and 3R3, and through resistor 3R1 to potential 326. As resistor 3R2 has a value of 15 ohms and resistor 3R1 has a value of 4700 ohms the voltage division of potential 326 is such that input 327 of multivibrator 328 is very close to ground potential. The removal of ground potential from lead 315, following the on-hook supervisory condition, changes the voltage division. Current now flows only through resistors 3R1 and 3R3. Illustratively, resistor 3R3 have a value of 5000 ohms and resistor 3R1 has a value of 4700 ohms and the voltage division across these two resistors is uch that input 327 is at a positive potential equal to approximately half the value of potential 326. This positive voltage change is sufficient to trigger multivibrator 328. Thus, in accordance with my invention, suppressor circuit 309 distinguishes between dial pulsing and an on-hook supervisory signal.

The 70 millisecond pulse on the $\overline{Q}$ output of multivibrator 328, in response to the on-hook supervisory signal, triggers multivibrator 334. As no other pulse will immediately follow this pulse, multivibrator 334 is not retriggered and generates only a 100 millisecond pulse on its Q and $\overline{Q}$ outputs. The pulse on output $\overline{Q}$ is applied to the toggle T input of flip-flop 337 and causes flip-flop 337, which is presently in its set state, to switch back to its clear state. The $\overline{Q}$ output of flip-flop 337, which is connected to the reset R input of counter 329, changes from low to high. Counter 329 is thereby cleared to zero count and is prevented from counting as previously described.

With counter 329 cleared to zero there is no low output on any output lead of converter 331. This causes potential 333 to be applied to input 1 of gates 332 and 335 and the output of the operated one of these gates returns to its normal low output. As a result, conducting ones of transistors 3Q3, 3Q4, and 2Q5 cease conduction and, if operated, relay 3TR is released. Resistor 3R3 and capacitor 3C2 are thereby disconnected from input 327 of multivibrator 328. At this time denial circuit 210, 310 is in its idle state waiting to check another outgoing call on line 214.

CALL TERMINATION WITHOUT DIALING

Upon the occurrence of a calling PBX station being connected to line 214 and then going on-hook without dialing, the opening of the line causes multivibrator 328 to generate a pulse, as described previously, and a "1" is registered in counter 329 as if the digit "1" had been dialed. This results in the operation of relay 3TR as priorly described. However, there is no subsequent opening of the central office line to release the circuitry in denial circuit 210, 310. I provide circuitry, however, to release the circuits in denial circuit 210, 310.

For a normally denied call off-hook supervision ground potential on lead 315 is connected via contact 3TR6 and resistor 3R4 to the base of transistor 3Q10. As ground potential 340 is connected to the emitter of transistor 3Q10 the transistor is not forward-biased and does not conduct. As a result positive potential 323 is connected over lead 341 to the 2 input of NOR gate 338. This causes gate 338 to remain in its normally low state and transistor 3Q11 does not conduct to enable the release of circuits in denial circuit 210, 310.

In the present situation, however, ground potential is not present on lead 315 so current flows between ground potential 340 and positive potential 326 through resistors 3R5 and 3R4, make contact 3TR6, and resistors 3R2 and 3R1. The voltage division of potential 326 across resistor 3R5 forward-biases transistor 3Q10 into conduction and ground potential 340 is connected over lead 341 to the 2 input of gate 338. Thus, both inputs of gate 338 are low and its output goes high and drives transistor 3Q11 into conduction to apply ground potential to clearing input CD of flip-flop 337. This causes flip-flop 337 to be returned to its clear state and results in counter 329 being cleared to zero as priorly described. Relay 3TR is thereby released and the opening of contact 3TR6 disconnects potential 326 from transistor 3Q10. Transistor 3Q10 ceases to conduct and denial circuit 210, 310 is in its idle state waiting to check a subsequent outgoing call on line 214.

When a call being placed over line 214 is denied, transistor 3Q10 does not erroneously operate for ground potential is present on lead 315. With ground potential on lead 315 transistor 3Q10 is not biased into conduction and potential 323 is applied via lead 341 to the 2 input of gate 338. This assures that the output of gate 338 will remain low and transistor 3Q11 will not erroneously conduct and cause the restoral of denial circuit 210, 310 to its idle state as just described.

What is claimed is:

1. Call denial equipment for blocking automatic completion of toll calls being placed over a telephone line to a central office comprising means for generating a pulse in response to each dial pulse and on-hook signal for a call on said line, means for counting said pulses from said generating means, means activated at the end of dial pulsing of the first digit for checking the pulse count of said counting means, said checking means generating a call denied signal upon said counting means having counted a predetermined number of pulses, means responding to said call denied signal to block completion of said call, means enabled responsive to said checking means having checked the pulse count of said counting means for subsequently conditioning said generating means to respond only to the on-hook signal for said call, and means responsive to the pulse from said generating means in response to the on-hook signal for clearing said counting means, the clearing of said counting means causing said checking means to disable said conditioning means.

2. The invention in accordance with claim 1 wherein said conditioning means comprises filter means connected to the input of said pulse generating means, and means responsive to said checking means having checked the pulse count of said counting means for changing the time characteristic of said filter means to thereby block the application of subsequently received dial pulses from said generating means.

3. The invention in accordance with claim 2 further comprising means activated by said generating means for determining the end of dial pulsing of the first digit, said determining means activating said checking means at the end of pulsing of the first digit for thereupon checking the pulse count of said counting means.

4. In an automatic telephone system having a central office containing a switching machine equipped to allow toll calls only when a specified digit prefixes a called station number, a dial private branch exchange associated with said office, and a central office line for extending outgoing calls from said exchange to said office, a call denial circuit connected to said line for blocking toll calls thereon comprising means for detecting dial pulsing and on-hook supervisory signals on said line, means responsive to said detecting means for generating a pulse in response to each dial pulse and on-hook supervisory signal on said line, means for counting pulses from said generating means, means responsive to pulses from said generating means for determining the end of dial pulsing of the first digit dialed over said line for the call, means activated by said determining means at the end of pulsing of the first digit for checking the pulse count of said counting means, said checking means generating a denied call signal upon said counting means having counted a predetermined number of pulses, and said checking means generating an allowed call signal upon said counting means having counted other than said predetermined number of pulses, means for blocking dial pulses detected by said detecting means from said generating means, means responsive to said call signals for connecting said blocking means to said generating means, and means controlled by a pulse from said generating means in response to the on-hook signal for clearing said counting means, said checking means causing a termination of the generation of said call signals in response to the clearing of said counting means, and said connecting means being responsive to said signal termination for disconnecting said blocking means from said generating means.

5. The invention in accordance with claim 4 wherein said blocking means comprises a resistor-capacitor filter connected to said pulse generating means.

6. The invention in accordance with claim 5 wherein said determining means comprises a one-shot multivibrator connected to said generating means, said multivibrator being triggered by pulses from said generating means in response to dial pulsing to generate an elongated pulse ending after completion of all dial pulsing of the first digit, said checking means being activated by the end of said elongated pulse, and said multivibrator being responsive to the pulse generated by said generating means for the on-hook signal to generate a second pulse for controlling said clearing means to clear said counting means.

7. The invention in accordance with claim 6 wherein said clearing means comprises a flip-flop connected to said multivibrator, said flip-flop being placed in a prescribed state by said second pulse, and an output signal generated by said flip-flop in said prescribed state for clearing said counting means.

8. A toll denial circuit connected to a telephone line and comprising dial pulse counting means, pulse generating means for driving said counting means in response to dial pulses and on-hook transitions on the telephone line, a filter circuit connected to the input of said pulse generating means, said filter circuit including a resistor and a first capacitor defining a first timing interval to prevent spurious pulses on the telephone line from triggering said pulse generating means while allowing dial pulses on said line to trigger said pulse generating means, means responsive to the end of the first dialed digit for checking the count of said counting means, and means responsive to said checking means for connecting a second capacitor in parallel with said first capacitor whereby said filter circuit defines a second timing interval to prevent subsequent dial pulses from triggering said pulse generating means while allowing an on-hook condition of said line to trigger said pulse generating means.

9. A toll denial circuit in accordance with claim 8 wherein said connecting means comprises means defining a first path if said counting means indicates a call is to be denied and means defining a second path if said counting means indicates a call is to be permitted.

* * * * *